3,433,612
APPARATUS AND METHOD FOR MANUFACTURE OF FLOAT GLASS WITH RESTRICTED LATERAL SPREAD
George Alfred Dickinson, St. Helens, John Henry Morgan, Liverpool, and James Edward Celfyn Thomas, and Brian William Oxley, St. Helens, England, assignors to Pilkington Brothers Limited, Liverpool, England, a corporation of Great Britain
Filed Feb. 8, 1966, Ser. No. 525,976
Claims priority, application Great Britain, Feb. 25, 1965, 8,191/65
U.S. Cl. 65—99                 8 Claims
Int. Cl. C03c 15/02

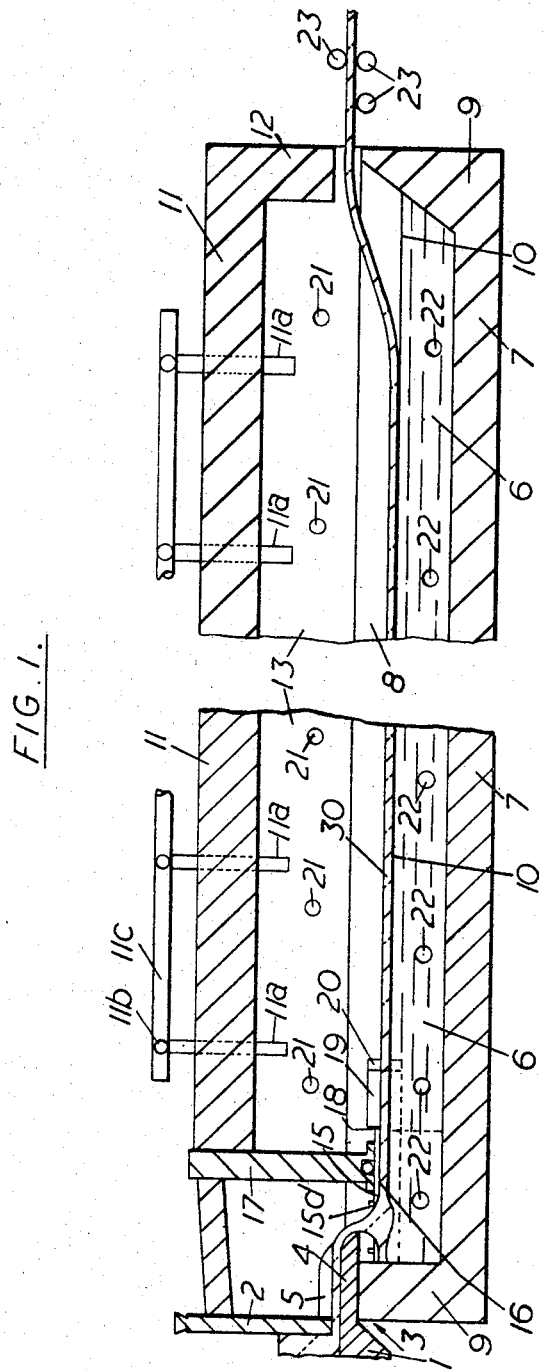

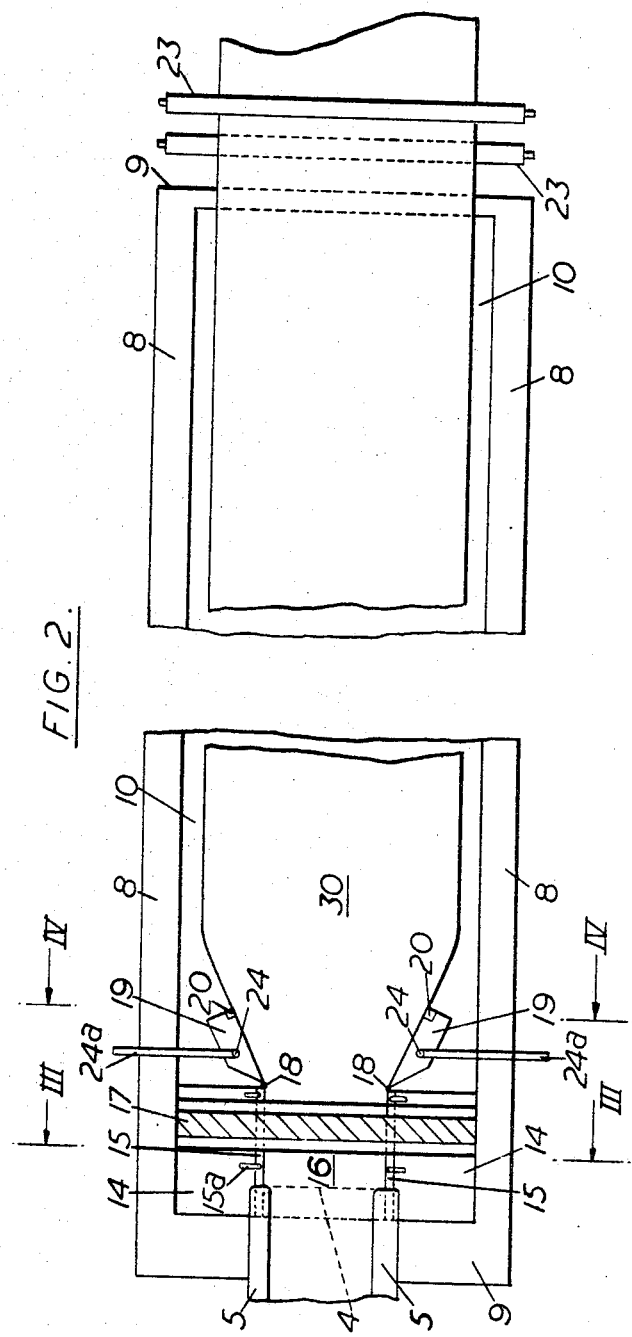

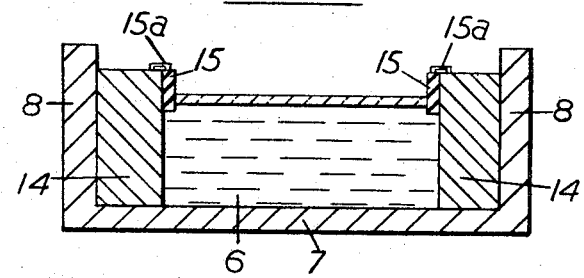
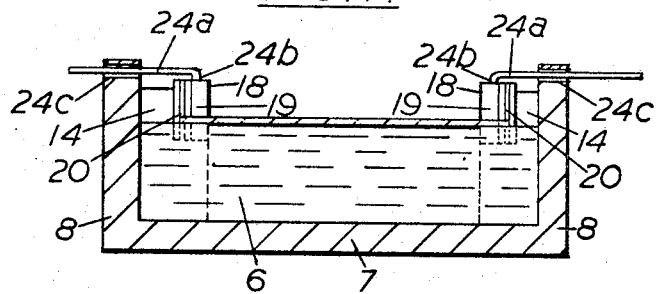

ABSTRACT OF THE DISCLOSURE

Molten glass is delivered to a bath of molten metal, is initially laterally contained on the bath and is then permitted restricted lateral spread controlled by surfaces of a material wetted by the molten glass as a ribbon of float glass is developed.

---

This invention relates to methods of making flat glass on a molten bath by flowing glass in a molten state on to the bath and advancing the glass along the bath until it is cooled sufficiently to be taken unharmed from the bath surface. Desirably the molten metal bath is a bath of molten tin or a molten tin alloy having a specific gravity greater than glass and in which tin predominates and preferably the bath is so constituted as to have all the characteristics described in U.S. Patent No. 2,911,759.

In U.S. Patent No. 3,083,551 there is disclosed a method of pouring glass at a controlled rate on to the bath to establish at the inlet end a layer of molten glass from which layer is developed on the bath under the influence of the forces of gravity and surface tension a buoyant body of glass in ribbon form as the glass is advanced along the bath towards the outlet end.

There are two main forces acting to advance the glass: the kinetic energy in the glass directed on to the bath by the pouring operation, and the pull on the glass originating in the traction force applied to the glass entering the lehr after discharge from the outlet end of the bath.

It has been proposed to heat the side jambs of a spout to compensate for loss of heat suffered by the margins of the glass flowing in contact with the side jambs and achieve a uniformity of temperature of the glass leaving the spout, but in flowing down the spout, due to the glass wetting the jambs, there is a frictional resistance to flow in the margins and a tendency to create, at the edges of the layer of glass established on the bath from the glass poured on, a greater thickness than that which exists in the middle area of the layer.

The main object of the present invention is to obtain an improved substance (i.e., thickness) control and improved flatness in the glass leaving the bath to meet consumers' requirements in industry.

In accordance with the present invention the thicker edges are evened out or substantially evened out thereby controlling the configuration of the transverse cross-section of the glass ribbon by containing the glass arriving on the bath during the initial period of its advance at a high temperature, e.g., 1030–1000° C. when it has become supported on the flat surface of the molten bath as a step precedent to establishing the layer on the bath, whereby the glass in the layer flowing laterally to the limit of its free flow is developed into a ribbon of glass of uniform thickness.

In carrying the invention into effect restricting walls extending along the molten bath for a distance of about 2.5 feet are provided as laterally spaced extensions of the side jambs of the spout so that the molten glass leaving the lip of the spout is contained on the bath between the opposed faces of the restricting walls for a sufficient period and at the high temperature of the bath and head space, to enable the glass to adopt the flatness of the bath and to permit any irregularities on the surface to be flowed out under the influence of gravity before it enters the layer.

The glass in the layer is permitted to flow laterally at the high temperature existing at the inlet end of the bath; thus a low viscosity obtains in the layer ensuring flattening of the layer on the bath.

From the foregoing it will be appreciated that the restricting walls are preferably parallel or may be slightly splayed, for example at an angle of about 5°, and that there is maintained between the spout and the commencement of the laterally moving layer can even body of molten glass, which thermally conditioned glass is fed to the layer from which, in turn, a ribbon of glass of required substance is developed.

The even molten body is supported on a section of the molten bath also confined between the walls, which walls offer frictional resistance to the glass body moving relatively to the bath and decelerate its advance while it is achieving the required even condition from the settling of the glass on the bath.

Thus in any transverse vertical section taken through the molten glass contained between the restricting walls near the ends of those walls remote from the spout a substantially uniform thickness exists from side to side and the layer commenced where an even thickness has been imposed on the glass and the volume supplied to the layer is symmetrical about the medial line of the layer in the direction of advance along the bath and enters the layer at a uniform speed.

Moreover thermal homogeneity is achieved in the contained body of glass during its residence between the restricting walls, so that the glass entering the layer is at a uniform (or substantially so) temperature and can be maintained in such thermal condition as it is advanced along the bath. Experiments have shown that the longer are the restrictor walls the greater is the extent of unhindered lateral flow of the molten glass and the wider is the ribbon developed from the molten layer, presumably due to greater conservation of heat in the glass between the restrictor walls due to longer residence. The restrictor walls may be heated in order to enhance the conservation of heat in the confined body of molten glass.

By feeding the conditioned glass into the layer as hereinbefore described, a better substance control can be achieved than has heretofore been obtained, and precise tolerances required by customers from time to time are achieved in the thickness of the ultimate ribbon taken off the bath.

The substance control is derived from the pull derived from the lehr traction rolls transmitted back to the restricting walls and the present invention comprises restricting said outward lateral flow by surfaces wettable by the glass as the lateral flow commences to enable any excess thickness at the margins of the layer to be attenuated over and dispersed into a greater marginal width of the glass by the applied tractive effort acting on the molten glass in the layer, and cooling the glass in ribbon form sufficiently to permit it to be taken up undamaged from the bath by mechanical means.

The restricted lateral flow here referred to is a step next precedent to permitting the glass in the layer to flow laterally unhindered, i.e., unopposed by any physical obstruction.

Broadly according to this aspect, the present invention provides in the manufacture of flat glass in ribbon form during which molten glass is advanced along a bath of molten metal and taken up therefrom in ribbon form under the influence of an applied tractive effort, the step of controlling the configuration of the transverse cross-section of the glass ribbon by delivering molten glass to the bath at a controlled rate, permitting said molten glass to spread laterally to an extent controlled by splayed surfaces of a material wettable by the glass and disposed at a selected angle to provide a controlled marginal reaction to the applied tractive effort, and then permitting the molten glass to flow outward laterally unhindered to the limit of its free flow, to establish a layer of molten glass on the bath and to develop therefrom a ribbon of glass having a desired configuration of transverse cross-section.

The invention also comprehends apparatus for use in the manufacture of flat glass in ribbon form, including an elongated tank structure containing a bath of molten metal, a spout extending over one end of the tank structure for pouring molten glass on to the bath at a controlled rate so that the molten glass advances along the bath, thermal regulators for conditioning the glass as it is advanced to assure that a layer of molten glass is established on the bath and an advacing buoyant body of glass in ribbon form is developed from said layer by permitting said layer of molten glass to flow laterally unhindered to the limit of its free flow under the influence of gravity and surface tension, and then to cool the glass for discharge from the bath by means applying tractive effort to the ribbon, characterised by restricting walls extending into the bath as laterally spaced extensions of the side jambs of the spout whereby molten glass leaving the lip of the spout is contained on the bath between the opposed faces of the restricting walls as the glass is advanced along the bath. Preferably the restricting walls are parallel, but they may be slightly splayed.

The glass in the layer is at a high uniform temperature, about 1000° C., being fed from glass in the body of glass contained at the inlet end of the bath over the aforesaid residence period, and the conditioned glass enters the layer at a uniform linear velocity. In applying traction effort to the layer from the lehr, the effort is applied to glass advancing in the direction of the pull and of uniform temperature. To distribute the pull from the lehr more evenly through the margins of the glass moving laterally under the influence of surface tension and gravity, diverging extensions to the restricting walls are provided which extensions float on the bath and restrict the initial outward lateral flow of the molten glass.

These diverging extensions preferably have plane surfaces and to permit setting of the divergence of the extensions relative to the restricting walls are pivotted to the downstream ends of the restricting walls. The extensions are set to arrest the progressively increasing lateral flow fo the advancing glass and then leave the glass free to flow laterally unhindered to the limit of its free flow under influence of gravity and surface tension, and the pull from the lehr.

Thus flatness is achieved in the forward area of the layer.

By creating the layer from a body of molten glass of relatively greater thickness than the layer the underface of the layer is flat, having been formed under an hydraulic head corresponding to the depth of glass between the restrictor walls, while the period of residence assures a settling down on the flat bath surface.

The length of the plane extensions inclined to the general direction of flow is preferably of the order of three feet, when set at an angle of about 25°, to the restrictor walls to give the layer edges a sufficiently extended contact with the floating extensions as the glass moves laterally between the extensions and relatively thereto, i.e., longitudinally of the bath.

Such length of the floating extensions permits a greater reaction force along the margins of the glass to the pull from the lehr, and uniform modification of the thickness of the layer as it is advanced during the progressively increasing lateral flow between the divergent extensions until the layer having been freed from the extension is permitted to flow laterally unhindered to the limit of its free flow under the influence of surface tension and gravity and the pull from the lehr.

The molten glass may be freed from the extension by providing the extensions with nonwetting surfaces at least at the free end of the extensions.

It will be appreciated that as the layer emerges from between the floating extensions and is exposed to the influence of the forces of surface tension and gravity, which event assures flatness of the glass, then the margins of the glass are reacting to the pull from the lehr and are themselves attenuated under the pull to produce a layer of substantially uniform thickness.

The longer the contact of the marginal areas of the glass with the extensions the greater the width of the margins of the layer of glass in which there is a positive reaction to the pull from the lehr. Accordingly by setting the length and the divergence of the extensions the extent of marginal attenuation is regulated and the development of the buoyant body of molten glass is effected under conditions which level out the edges of the layer.

Alternatively and preferably the extensions may be given a greater length such that the desired reaction to the pull is obtained without changing the pristine divergence of the extensions.

Having achieved a desired thinning of the glass in the layer from the lehr pull, edge rolls may be employed on the ribbon of glass developed from the layer acting on the upper surface of the glass, the vertical reaction force being provided by the bath to maintain the width of the glass in ribbon form as it is advanced along the bath. Such rollers are disclosed in FIG. 8 of the aforesaid prior patent. However, pairs of cooperating rolls may be employed at each edge of the glass in ribbon form to maintain the width and assist in the work of advancing the glass on the bath to the outlet end thereof.

In order that the invention may be more clearly understood a preferred embodiment thereof will now be described by way of example, wtih reference to the accompanying diagrammatic drawings.

In the drawings:

FIGURE 1 is a sectional elevation of apparatus according to the invention comprising a tank structure containing a bath of molten metal, a roof structure over the tank structure and apparatus for delivering molten glass at a controlled rate on the bath surface, FIGURE 2 is a plan view of the apparatus according to FIGURE 1, with the upper parts removed to show the arrangement of restricting walls in the tank structure, FIGURE 3 is a section on line III—III of FIGURE 2, and FIGURE 4 is a section on line IV—IV of FIGURE 2.

In the drawings like reference numerals designate the same or similar parts.

Referring to the drawings a forehearth of a continuous glass melting furnace is indicated at 1, a regulating tweel at 2 and a spout at 3, The spout 3 comprises a lip 4 and side jambs 5 which form with the lip a spout of generally rectangular cross-section. A cover is fitted over the spout 3 in well-known manner.

The spout 3 just described is disposed over one end of a tank structure which contains a bath 6 of molten metal, for example molten tin or molten tin alloy having a specific gravity greater than the specific gravity of molten glass and in which tin predominates. The tank comprises a floor 7, side walls 8 and end walls 9. The side walls 8 and end walls 9 are integral with each other and with the floor 7. The level of the surface of the bath 6 of molten metal is indicated at 10.

The tank structure supports a roof structure bridging the bath and including a roof 11, an end wall 12 at the outlet end of the bath and side walls 13 so that the roof structure provides a tunnel over the bath 6 and defines a headspace over the bath into which headspace a protective atmosphere is fed.

In the tank structure there is provided a fixed wall structure 14 and this wall structure 14 extends to the full depth of the tank may in fact be built into the tank structure as a permanent fixture. Attached to the structure 14 are floating restricting walls in the form of tiles 15 of refractory material which define a passage 16 beneath the spout 3 at the inlet end of the bath. The floating tiles 15 are attached to the fixed wall structure 14 by means of straps 15a as shown in FIGURES 2 and 3.

Resting on the wall structure 14 and the floating tiles 15 is a rigid curtain 17 for effecting a seal between the atmosphere over the main bath 6 within the tank structure and the atmosphere in the inlet part of the bath structure in the region of the spout 3. The rigid curtain 17 abuts against the end of the roof at the inlet end of the bath. The seal is provided by the curtain 17, for example by creating an outward laminar flow of protective gas in the manner described in U.S. Patent No. 3,351,451. The protective atmosphere over the main part of the bath 6 is fed into the bath through ducts 11a connected by headers 11b to a main supply duct 11c, and is maintained at a plenum as a further protection against the ingress of ambient atmosphere.

Pivotally attached to the corners 18 of the floating restricting tiles 15 are two floating tiles 19 which are also of refractory material except for their corners 20 which are the corners remote from the floating tiles 15 and which are made of carbon. The tiles 19 form extensions to the restricting walls 15. As shown in FIGURES 2 and 4 there are locating holes 24 in the top surfaces of the tiles 19. Water cooled pipes 24a have downwardly bent ends 24b which fits into the holes 24a and the pipes pass through sealing glands 24c set in apertures in the side walls of the tank structure. The pipes 24a are slidable in the glands 24c to locate the tiles 19 with the desired divergence.

The spout 3 is disposed in overlapping relation to the tank structure so that the lip 4 of the spout is disposed over the molten tin, and molten glass flowing from the glass melting furnace over the spout 3 is caused to have a free fall of several inches to the level of the bath surface 10. The spout 3 imparts to the molten glass flowing on to the bath a general forward directional movement along the length of the tank, but the undersurface of the molten glass which has been in contact with the surface of the spout is permitted to flow rearwardly to form a heel of molten glass under the spout 3.

The molten glass delivered to the bath 6 from the spout 3 immediately tends to spread on the surface of the bath but the molten glass is initially contained against such spreading by the presence of the floating restricting tiles 15. The molten glass is therefore maintained at a higher temperature than if it was allowed to spread immediately, with the result that a more uniform temperature throughout the molten glass between the floating restricting tiles 15 is obtained.

Also because the molten glass is maintained at a higher temperature between the restricting tiles 15, the molten glass more readily settles on the bath after delivery from the spout 3 and adopts level surfaces both on the surface which is in contact with the bath of molten metal and also at the upper surface in the protective atmosphere. Consequently an even body of molten glass is obtained flowing forwardly along the bath past the outlet ends 18 of the floating restricting tiles 15. This even body of molten glass is impelled forwardly along the bath by a head of molten glass which is built up by the flow of molten glass on to the bath from the spout 3.

The tendency of the even body of molten glass flowing between the ends 18 of the floating restricting tiles 15 to spread immediately to the limit of its free flow under the influence of the forces acting thereon including the forces of gravity and surface tension is restricted by the presence of the floating extension tiles 19 which are splayed by the setting of the pipes 24a, at an angle to the length of the bath so that restricted spreading of the glass is permitted and a full spreading of the layer of molten glass between the floating tiles 19 occurs as the glass leaves the carbon tips 20 on the tiles 19. The floating tiles 19 are set to a desired position when the process is set up in order to achieve a desired thickness of the glass taken from the bath by the rollers 23.

The temperature gradient down the bath is regulated by heaters 21 mounted in the roof over the bath and further temperature regulators shown as heaters 22 mounted in the bath.

As the layer of glass spreads to the limit of its free flow under the influence of gravity and surface tension, there is developed a buoyant body 30 of molten glass which is continuously advanced in ribbon form along the bath and is cooled as it is advanced until at the outlet end of the bath where the temperature is about 600° C. the ribbon can be taken unharmed from the bath by driven rollers 23 disposed at the outlet end of the tank and slightly above the level at the bottom of the outlet from the bath. The driven rollers 23 apply a tractive effort to the glass to take the glass from the bath in ribbon form.

The molten glass which is delivered to the bath 6 from the spout 3 is at a temperature of the order of 1040° C. to 1030° C. so that the molten glass on the bath beneath the spout 3 is at a temperature of about 1030° C. Owing to the presence of the restricting tiles 15 the heat in the molten glass is conserved as already mentioned and the temperature of the even body of the molten glass flowing between the ends 18 of the restricting tiles 15 is of the order of 1000° C. The carbon tips 20 on the tiles 19 provide a clean take-off so that the molten glass spreads consistently from the corners 20 of the floating tiles 19 throughout the operation of the process.

The temperature of the molten glass flowing between the floating tiles 19 decreases until, as the glass spreads laterally unhindered, the temperature of the molten glass is of the order of 950° C.

Because the molten glass between the floating tiles 19 is in contact with and wets the surface of these floating extension tiles 19 there are wide margins of the layer of glass which provide a reaction force to the tractive effort applied to the ribbon of glass from the rollers 23, and the effect of the tractive effort in attenuating the thicker edges of the glass is enhanced by dispersion of the thicker edges of the glass into those wide margins.

It is particularly important that such an effect should be present in the process when the rollers 23 are applying a considerable attenuating force to the molten glass to reduce the thickness to the order of 3 mm. because when a glass ribbon of this order of thickness is produced by the process, the tendency is for the glass in the edges of the ribbon to be thicker than the glass in the central part of the ribbon. However, the conditioning of the margins of the glass to distribute more positively across the width of the ribbon the tractive effort applied by the rollers 23 enables the margins to be thinned so that a glass ribbon of a consistent and desired configuration of transverse cross-section is obtained.

By the use of apparatus as described it is possible for one tank structure to be adapted to the manufacture of glass ribbons of different dimensions as for example the floating tiles 15 may be removed and replaced by other floating tiles of different thickness so that the width of the molten glass between the floating restricting tiles 15 may be varied. Also the rate of delivery of the molten glass to the bath and the profile of the molten glass may be varied by moving the tweel 2 or by using a tweel having a particular profile at its lower edge.

As regards the floating restricting tiles 15, these need not necessarily be parallel to one another provided that they are splayed by only a comparatively small amount and they still exert a restraining or containing effect on the molten glass between them to conserve the heat in the glass and allow the settling of the molten glass on the bath to give an even body flowing from between the floating restricting tiles 15. In particular it is found that by use of apparatus as hereinbefore described, the glass ribbon may be obtained which is entirely free of longitudinal ridges.

The floating restricting tiles 15 serve another purpose in that they permit of adjustment of the curtain 17 above the level of the molten glass to fix the distance between the lower edge of the curtain and the surface of the molten glass at a desired distance, for example a practical minimum.

We claim:

1. A method of manufacturing flat glass is ribbon form during which molten glass is poured at a controlled rate on to a bath of molten metal, the molten glass is advanced along the bath under thermal conditions which assure that a layer of molten glass is established on the bath, a buoyant body of glass in ribbon form is developed on the bath during the advance by permitting the said layer of molten glass to flow laterally, and the glass in ribbon form is cooled and discharged from the bath under the influence of an applied tractive effort, wherein the improvement comprises laterally confining the glass arriving on the bath during the initial period of its advance at the high temperature, e.g., 1030° C. to 1000° C. when it has become supported on the flat surface of the molten bath, then restricting lateral spreading of the advancing molten glass after its release from said confinement, by establishing wetting contact with the edges of the spreading glass to provide marginal reaction force to said tractive effort, and setting the angle of said wetting contact whereby the marginal reaction force is effective over a predetermined marginal width of the glass.

2. A method of manufacturing flat glass in ribbon form during which molten glass is delivered at a controlled rate to a bath of molten metal the glass is advanced along the bath and is discharged therefrom in ribbon form under the influence of an applied tractive effort, wherein the improvement comprises laterally confining the glass arriving on the bath during the initial period of its advance at a high temperature, e.g., 1030° C. to 1000° C., while thermally treating the glass for a sufficient period to bring the molten glass to a desired configuration and physical state, then permitting outward lateral flow of the molten glass as a layer on the bath to develop from the layer, by free flow of the molten glass under the influence of gravity and surface tension, a buoyant body of glass in ribbon form, restricting said outward lateral flow by establishing wetting contact with the edges of the spreading glass to provide marginal reaction force to said tractive effort thereby enabling any excess thickness at the margins of the layer to be attenuated over and dispersed into a greater marginal width of the glass by the applied tractive effort acting on the molten glass in the layer, setting the angle of said wetting contact to predetermine the marginal width of the glass in which said dispersion takes place, and cooling the glass in ribbon form sufficiently to permit it to be taken up undamaged from the bath by mechanical means.

3. A method of manufacturing flat glass in ribbon form which molten glass is delivered to a bath of molten metal at a controlled rate, and is advanced along the bath and cooled sufficiently to be taken up therefrom in ribbon form under the influence of an applied tractive effort, wherein the improvement comprises the step of controlling the configuration of the transverse cross-section of the glass ribbon by delivering molten glass to the bath at a controlled rate, permitting said molten glass to spread laterally establishing wetting contact with the edges of the spreading glass and selecting the angle of said wetting contact to provide a controlled marginal reaction to the applied tractive effort and then permitting the molten glass to flow outward laterally unhindered to the limit of its free flow, to establish a layer of molten glass on the bath and to develop therefrom a ribbon of glass having a desired configuration of transverse cross-section.

4. Apparatus for use in the manufacture of flat glass in ribbon form, including an elongated tank structure containing a bath of molten metal, a spout extending over one end of the tank structure for pouring molten glass on to the bath at a controlled rate so that molten glass advances along the bath, thermal regulators located relative to the tank structure for conditioning the glass as it is advanced, means including said thermal regulators, to assure that a layer of molten glass is established on the bath and an advancing buoyant body of glass in ribbon form is developed from said layer of molten glass as it flows laterally under the influence of gravity and surface tension, and then to cool the glass for discharge from the bath by means applying tractive effort to the ribbon, wherein the improvement comprises restricting walls extending into the bath as laterally spaced extensions of the side jambs of the spout whereby molten glass leaving the lip of the spout is contained on the bath between the opposed faces of the restricting walls as the glass is advanced along the bath diverging extensions to the restricting walls floating on the bath to restrict the initial outward lateral flow of the molten glass, said extensions being of material wettable by the molten glass, and means for setting the angle of said extensions.

5. Apparatus according to claim 4, wherein the restricting walls are parallel or substantially so.

6. Apparatus according to claim 4, wherein the diverging extension have plane surfaces and are pivoted to the downstream ends of the restricting walls to permit setting of the divergence of the extension relative to the restricting walls.

7. Apparatus according to claim 4, wherein the extensions are provided with non-wetting surfaces at the free end of the extensions.

8. Apparatus for use in the manufacture of flat glass in ribbon form, including an elongated tank structure containing a bath of molten metal, a spout extending over one end of the tank structure for pouring molten glass onto the bath at a controlled rate so that the molten glass advances along the bath, thermal regulators located relative to the tank structure for regulating the temperature of the glass as it is advanced, means including said thermal regulators to assure that a layer of molten glass is established on the bath and an advancing buoyant body of glass in ribbon form is developed from said layer of molten glass as it flows laterally under the inculdence of gravity and surface tension and then to cool the glass for discharge from the bath, and means applying tractive effort to the ribbon, wherein the improvement comprises restricting walls extending into the bath as laterally spaced extensions of the side jambs of the spout, which restricting walls are parallel or substantially so, so that molten glass leaving the lip of the spout is contained on the bath between the opposed faces of the restricting walls as the glass is advanced along the bath, and diverging extensions to the restricting walls, which extensions are of material wetted by the molten glass and float on the bath to restrict the initial outward lateral flow of the advancing molten glass.

References Cited

UNITED STATES PATENTS

| | | | |
|---|---|---|---|
| 2,276,615 | 3/1942 | Hazelett | 65—91 |
| 3,186,813 | 6/1965 | Pfaender | 65—90 |
| 3,266,880 | 8/1966 | Pilkington | 65—99 |
| 3,351,452 | 11/1967 | Robinson | 65—182 |

DONALL H. SYLVESTER, *Primary Examiner.*

R. V. FISHER, *Assistant Examiner.*

U.S. Cl. X.R.

65—65, 182, 91